United States Patent [19]

Lemelson

[11] 4,149,088
[45] * Apr. 10, 1979

[54] ELECTRO-OPTICAL CIRCUITS AND MANUFACTURING

[76] Inventor: Jerome H. Lemelson, 85 Rector St., Metuchen, N.J. 08840

[*] Notice: The portion of the term of this patent subsequent to Jan. 25, 1994, has been disclaimed.

[21] Appl. No.: 761,312

[22] Filed: Jan. 21, 1977

Related U.S. Application Data

[63] Continuation-in-part of Ser. No. 555,794, Mar. 6, 1975, Pat. No. 4,005,312, and Ser. No. 425,618, Dec. 17, 1973, abandoned, and Ser. No. 413,983, Nov. 8, 1973, abandoned, which is a continuation-in-part of Ser. No. 849,115, Aug. 11, 1969, abandoned, which is a continuation-in-part of Ser. No. 422,875, Nov. 25, 1964, Pat. No. 3,461,347, said Ser. No. 425,618, is a continuation-in-part of Ser. No. 115,208, Feb. 16, 1971, Pat. No. 3,801,366, which is a continuation-in-part of said Ser. No. 849,115.

[51] Int. Cl.² ............................................. G02B 27/00
[52] U.S. Cl. ..................................... 250/551; 357/19
[58] Field of Search .............. 250/227, 551; 350/96 B, 350/96 WG; 357/19

[56] References Cited

U.S. PATENT DOCUMENTS 4,005,312  1/1977  Lemelson ............................ 250/551

Primary Examiner—David C. Nelms

[57] ABSTRACT

Improvements are provided in electro-optical circuits and techniques for manufacturing same. Circuits are formed by depositing or otherwise providing strips or layers of light conducting material on a substrate and forming circuits thereof with electrical elements such as light emitting and light sensitive electrical devices which are formed thereon or otherwise provided in optical coupling relationship with the light conducting material.

10 Claims, 4 Drawing Figures

ELECTRO-OPTICAL CIRCUITS AND MANUFACTURING

RELATED APPLICATIONS

This is a continuation-in-part of Ser. No. 555,794 filed Mar. 6, 1975, U.S. Pat. No. 4,005,312, a continuation-in-part of Ser. No. 413,983 filed Nov. 8, 1975, abandoned, which was a continuation-in-part of Ser. No. 849,115 filed Aug. 11, 1969, abandoned, as a continuation-in-part of Ser. No. 422,875 filed Nov. 25, 1964, U.S. Pat. No. 3,461,347. This is also a continuation-in-part of Ser. No. 425,618 filed Dec. 17, 1973, abandoned, for Electrical Device and Method as a continuation-in-part of Ser. No. 115,208 filed Feb. 16, 1971, U.S. Pat. No. 3,801,366, which is a continuation-in-part of Ser. No. 849,115 (now abandoned) filed August 11, 1969.

SUMMARY OF THE INVENTION

This invention relates to the manufacture of electro-optical circuits and circuit elements and, in particular to techniques and structures which employ thin strip elements of light conducting plastic or glass to transmit light from an electrically energized light source to one or more light sensitive electrically energized elements.

It is known in the art to fabricate so-called light pipes of glass and plastic filaments which are formed by extruding or spinning these materials into round wires. These elements have been formed into so-called fiber optical cables which have been used in electro-optical transmission systems. A shortcoming in using such wires or cable is that they require fabrication techniques in applying same to electro-optical circuits and device which techniques are tedious and require substantial labor.

The instant invention is drawn to light pipe structures and methods for producing same from thin sheets, strips or film of light conducting material such as certain glasses and plastics having desired light transmission characteristics wherein light transmission circuits are formed directly on a substrate such as a sheet material or an electrical circuit board or chip. By employing such techniques, the cost of producing so called electro-optical circuits is substantially reduced and certain improvements in structure are derived.

Accordingly it is a primary object of this invention to provide new and improved methods for producing electro-optical circuits and circuit elements.

Another object is to provide a method for producing electro-optical circuits by forming at least certain components thereof directly on a substrate to eliminate one or more hand assembly operations.

Another object is to provide a method of producing new and improved pipes by forming same in situ on a substrate.

Another object is to provide a method of producing a fiber optical cable by forming or otherwise providing a plurality of strip-like light pipes on a flexible substrate.

Another object is to provide a method of producing electronic circuits with light conducting elements and light emitting elements which are selectively deposited on a substrate.

Another object is to provide a method for producing electro-optical circuits containing a plurality of light conducting elements which are formed from a single sheet or layer of light conducting material laminated or otherwise provided on a substrate.

Another object is to provide a method for forming light conducting elements such as light pipes and the like by depositing thin films of light conducting material onto a substrate.

Another object is to provide a method for producing electronic circuits composed of electrical circuit interconnects, semi-conducting elements, light conducting elements and the like wherein the materials thereof are deposited onto a substrate and, in certain instances, are selectively processed on the substrate to complete the circuit or circuits thereon.

With the above and such other objects in view as may hereafter more fully appear, the invention consists of the novel methods constructions, combinations and arrangements of parts as will be more fully described and illustrated in the accompanying drawings, bu it is to be understood that changes, variations, and modifications may be resorted to which fall within the scope of the invention as claimed.

Figures 1, 2:
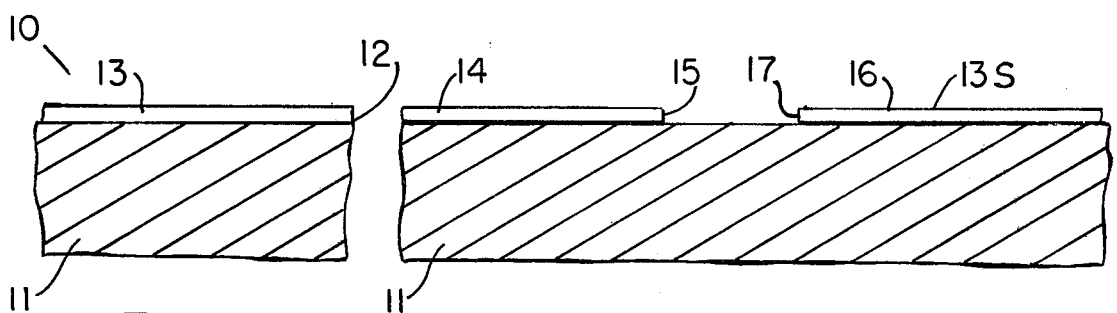
FIG. 1 is a side view in partial section of a portion of an electro-optical circuit board containing a thin sheet or layer of light transmission material bonded to a surface of the board.
FIG. 2 is a side view in section of the board of FIG. 1 having portions of the light conducting sheet or layer removed by processing to form a plurality of strip-like light pipes or conductors thereof.

FIG. 1 illustrates a composite article 10 such as an electrical circuit board or an electrical component having a base or substrate 11 preferably made of an insulating material such as a plastic, glass, ceramic or laminates of these materials. The substrate 11 has a flat outer surface 12 against which is bonded a sheet or layer 13 of light transmitting material such as clear fused silica, borosilicate glass, a transparent polymer or other suitable material having a relatively high refractive index. The layer 13 may be formed as a thin sheet and bonded to the surface 12 or may be deposited thereon as sprayed particles, electrostatically deposited particles, a vapor or other suitable form employing any suitable means to deposit and retain the light transmitting material thereon.

In FIG. 2, one or more separate portions of the layer 13 have been removed from the substrate by mechanical erosion such as by abrasive particle blasting or by chemical etching, thus leaving space separated portions 14 and 16 thereof which may comprise narrow strips or otherwise configured formations defining respective light pipes. The strips 14 and 16 may extend in any desired configuration across the surface 12 and each preferably contains an end face, denoted respectively 15 and 17 which end faces are in alignment with and face each other. While the configurations of the strips 14 and 16 may be retained as formed during the material removal process, the end faces 15 and 17 which are adjacent to each other preferably have surfaces at right angles to the surface 12 and the upper major surface 13S of the strips which may be provided during the removal process or by means of an auxiliary operation such as by flowing abrasive bits thereagainst.

Figure 3:
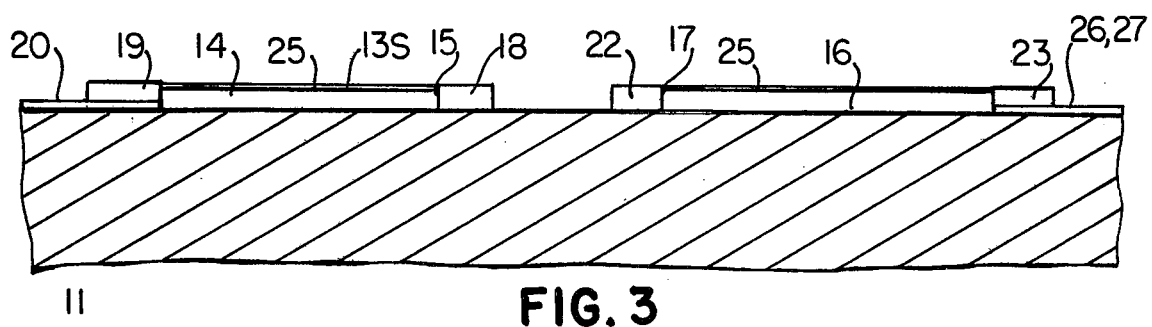
FIG. 3 is a side view in section of an extended portion of the board of FIG. 1 showing a plurality of electrical elements added to the assembly and FIG. 4 is a plan view of a portion of the circuit board of FIG. 3.
Figure 4:
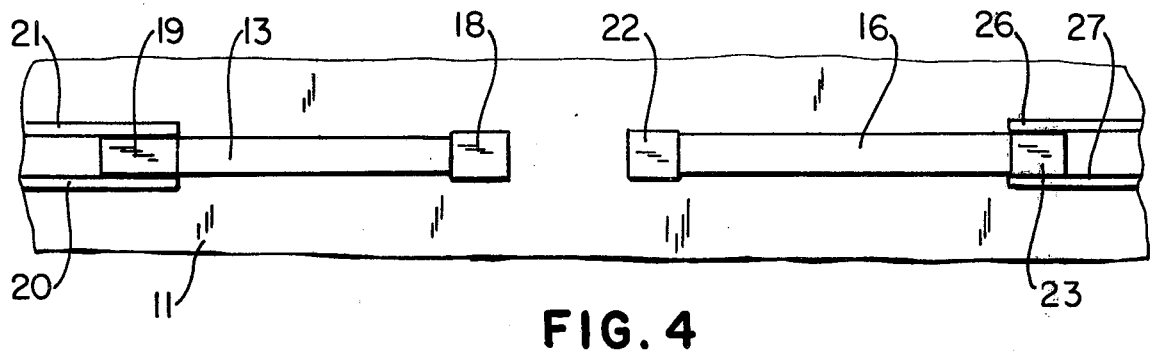

In FIG. 3, components have been added to the substrate 11 and bonded against either or both ends of the strips 14 and 16, preferably by deposition thereabove such as by sputtering, vapor deposition or plating one or more materials to form the components. Deposited or otherwise provided against the substrate 11 and the end face 15 of strip 14 is a small quantity of a first material 18 which is a light transmitting material such as highly refractive glass or plastic as described above and hereafter which is shaped to define a window or lens for receiving light from the end of light pipe strip 14 and directing it toward the end of strip 16. Deposited against the end 17 of strip 16 is a second component 22 of material which may be similar to that forming window component 18 and is shaped to form a window or lens for receiving and properly directing light from the strip 14. Notation 19 refers to a light emitting device such as a galium arsenide junction laser which is either a preformed component secured to substrate 11 in optical coupling with the other end of strip 14 or is formed of a plurality of materials which are sequentially deposited adjacent to or against the other end of light conducting strip 14. A plurality of electrical conducting strips 20 and 21 are shown also deposited against or formed on the substrate by other known means and are connected to the terminal portions of the light emitting component or laser 19 for supplying variable electrical energy or signals for modulating the laser to generate pulses of light energy which are transmitted along the light pipe strip 14 to the end thereof and across the gap to the strip 16 after passing through the lens or window 22. Conducting strips 20 and 21 may be connected, for example, to an electronic driver circuit receiving code input signals from a time division multiplexer which receives encoded signals from an encoder connected to one or more sources of information such as one or more computing circuits, transducers or the like.

Deposited or otherwise secured against the other end of strip 16 and substrate 11 is a fourth component 23 which is a light sensitive cell such as a silicon photodetector. Like component 19, cell 23 may be preformed and bonded to the substrate 11 and strip 16 or may be formed in situ against the end of strip 16 or in coupling relation with the strip end by selectively depositing a plurality of materials including active and insulating layers of known materials which comprise the photodetector. Notations 26 and 27 refer to metal strip circuit elements connected to the terminal portions of photodetector 23 for energizing and transmitting the light modulated current therefrom which varies in accordance with variations in the light passed through the strip 16 from strip 14 as generated by the laser 19.

Notation 25 refers to a cladding material which is deposited on the surfaces 13S of strips 14 and 16 and has an index of refraction which is substantially different from the index of refraction of the material of the strips 14 and 16. Material 25 may also be provided under the strips 14 and 16 by depositing or otherwise applying a layer thereof onto surface 12 prior to bonding layer 13 to the substrate so as to provide a clad layer which provides a highly reflective interface with the surface of the light transmitting material to which it is bonded which completely extends around each strip if such coverage is desirable and necessary to avoid or reduce light transmission loss in strips 14 and 16. Such application of cladding material will require the removal of same from the ends 15 and 17 of strips 14 and 16, as well as the opposite ends of said strips, prior to applying the described components 18, 22 and 23 and component 19 if it is applied directly to the end of strip 14. Conducting strips 20, 21, 26 and 27 as well as other electrical circuit interconnections and components which form such cooperating devices as encoders, decoders, multiplexers, amplifiers, preamplifiers, drivers and regenerators as well as the interconnections therefore may also be secured to or formed in situ on the substrate and or the light conducting material prior to or after the above described procedures.

In a particular method of forming light conducting circuits of the type described, the light conducting material originally disposed on surface 12 of substrate 11 may have the cladding material deposited as a layer on either or both of its outer surfaces prior to forming the strip elements 14 and 16 thereof or after such formation.

Material of substrate 11 forming the upper surface 12 thereof may be such as to serve the same purpose as a cladding material for the bottom surfaces of the strips 14 and 16 (e.g., to provide the bottom surfaces in a highly reflective condition for reflecting light directed along the strips back into the strip material.

In yet another form of the invention, it is noted that strips 14 and 16 as well as a plurality of others of such strips, may be deposited by sputtering the light conducting material thereof through openings in a mask having the shape of the strips, by vapor deposition through mask openings or by other means.

It is also noted that the cladding material may be sputtered against the exposed surfaces of the strips 14 and 16 as well as other similarly composed light conducting strips by sputtering thereon or by any suitable chemical or vapor deposition process.

The cladding material may also be eliminated from the described processes if the light conducting material is of such a characteristic or the surfaces thereof formed sufficiently light reflecting to maintain reflection losses within the light pipe strips at a predetermined minimum level.

Depending on the characteristics and areas of the light conducting strips 14 and 16, certain, if not all of the electrical components including computing circuits, encoders, decoders, multiplexers, drivers and regenerators may be formed by deposition directly on to said light conducting strips or may be deposited or otherwise formed on adjacent areas of the upper surface 12 of the substrate 11 after the portions of the light conducting material have been removed from said adjacent areas so as to provide a composite electro-optical circuit or computer having electrical components formed in situ on the substrate and associated optical components also formed, as described, on the substrate.

In addition to the single layer array of two or more electro-optical components of the type shown in FIG. 3, many additional optical components together with additional light generating and receiving electronic devices may be formed on a single substrate as a single layer of such components or as a plurality of layers thereof which are deposited, one upon the other wherein the components of adjacent layers may be optically and or electrically coupled to form a complex computer or computing circuit.

The described light transmitting and cladding materials may comprise such materials which are known in the art and are employed in the manufacture of separate light pipe wires and cables formed thereof. Electrical circuit components such as circuit interconnects, light emitting diodes and light sensitive elements, electrical circuit transistors and other devices associated with the described encoders, decoders, multiplexers, amplifiers, drivers regenerators and the light which are associated with the described light pipes, may be formed of known materials by techniques which are known in the art and are modified in accordance with the requirements associated with forming the optical light pipes directly on the substrate as described. Such electrical circuit elements may be partly or totally formed adjacent to and/or on the upper surface of the light transmitting material defining the described and illustrated strip-like light pipes.

While the drawings illustrate two strip-like light pipes in optical coupling relationship with each other, the invention may include a single light pipe with a light emitting diode or laser, such as a galium arsenide junction laser, at one end thereof and a light sensitive means such as a silicon photodetector at the other end thereof or may comprise a multitude of similar light conducting strip-like light pipes in any suitable array disposed against the surface of the substrate or against electrical circuit elements bonded to said substrate. For example, one thin strip-like light pipe formation may have one end coupled to the output of a light emitting semiconducting material and the other end thereof connected or optically coupled to a plurality of other similar light conducting strips or integrally formed as a branch strip-like portion therewith.

While chemical etching has been proposed for removing portions of the light transmitting sheet or layer from the surface of the substrate to form the individual light pipes thereof, an intense radiation beam such as an electron beam or a laser beam may be employed to erode or vaporize the selected portions of the light conducting material from the substrate to form the light pipes thereof and/or otherwise fabricate same. The beam or beams may be selectively deflection controlled and/or the support for the substrate moved to effect selective scanning of the substrate thereby to remove just that light transmitting material required to form circuits thereof. The same beam may also be employed to form or fabricate portions of the electrical circuit elements disposed on the substrate and forming part of the electrical device of which the light pipes are a part.

Other variations in the circuits described include the following:

I. Complex combined electrical and electro-optical microminiature communication and computing circuitry including both passive and active devices, computing devices, detection devices, memories and the like may be fabricated which includes thin strip flat light pipes formed in situ as one or more layers on a substrate and coupled or connected to light generating devices such as semiconductor or lasing materials which are deposited in situ either at the ends of the strips or space separated therefrom and connected to electrical conducting strips of metal or conducting polymers or ceramics which are also deposited on the substrate or formed thereon by chemical or mechanical etching, beam erosion or selected conversion of deposited material to conducting or non-conducting compounds. Similarly, one or more light detectors may be formed in situ against the ends of the light pipes or spaced therefrom by deposition through a mask or by means of a radiation beam depositing same against the substrate, light pipe or previously deposited or formed conducting material for the purpose of detecting the light passed through the light pipes so formed and generating or modulating electrical signals in the outputs thereof. If the device so formed is employed as a component of a computer or other device employed to detect light generated by a source other than one on the device, then only one or more light detectors may be formed on or assembled with the substrate.

II. Circuitry may be provided which includes, in addition to light pipes and strip-like electrical conductors, photoelectric cells and light emitting semi-conducting devices, electronic switching devices, capacitors, resistors and inductors formed in situ by known deposition, etching, doping and isolation means wherein such components are connected or coupled to define a complete component or computer capable of performing complex computational operations. Such circuitry may be formed by multiple operations which may be performed in any desired sequence certain of which operations may be repeated to form multiple layers of respective or combined light transmitting and electrical circuitry. These operations may include known techniques for forming electronic circuits including selective etching, erosion, isolation, chemical conversion or deposition and for forming the described light pipe structures by selective deposition of the light transmitting material and/or the cladding material, selective erosion, beam vaporization or chemical etching of either or both such materials wherein the light conducting material may be deposited or secured to the substrate or to components secured to the substrate and the electrical conducting and semiconducting materials may be deposited or otherwise secured to the substrate or to the light conducting material or a combination of both.

III. The cladding material may be eliminated if the light conducting material serves to conduct sufficient light therealong to perform the desired function of properly energizing the photoconductor which is coupled or connected thereto.

IV. The cladding material may comprise an electrical conducting material which may be used as part of the electrical circuitry secured to the substrate.

V. One or more thin strips of electrical conducting material may be secured to the thin strip light conductors so formed or applied to the substrate.

VI. The light conducting circuitry may be formed or deposited directly above the electronic circuitry formed on the substrate or chip or may be in the same stratum as the electronic circuitry.

VII. The electronic circuitry may be formed or deposited in situ on the light conducting circuitry.

VIII. Vapor or beam deposition means may be provided to form either or both the light conducting circuitry and the electronic circuitry. The light conducting circuitry may be formed by selectively polymerizing, as with a radiation beam such as generated by a laser or electron gun or through a mask, a thin film of a suitable resinous monomer and thereafter removing the unpolymerized portions of the monomer from the substrate.

IX. The substrate itself may be formed of a highly reflecting material whereupon it will only be necessary to coat the edges and outer surface of the light conducting strip(s) with cladding material to form light pipes thereof.

X. The end portions of each light conducting strip formed on the substrate may be employed per se without the need to form or apply optical devices thereto if properly etched or eroded to provide a suitable interface to or from which light may be passed to a desired light responsive photodetector or be received from a light source coupled thereto.

XI. Suitable additional optical components such as prisms, mirrors or reflectors, lenses and the like may also be formed in situ on the substrate or on material or components secured to the substrate by controlled deposition, erosion, beam vaporizaton or etching of the light conducting material therefor applied to the substrate, light pipe or other components secured to the substrate. These components may be coupled to the light pipes or secured thereto at suitable locations such as at the ends thereof.

I claim:

1. An electro-optical circuit defined by a composite structure comprising in combination:
   a substrate,
   a laminate to said substrate including a layer of light transmitting material bonded thereto and defining a light pipe capable of transmitting light along its length,
   electro-optical transducing means secured to said composite structure in optical coupling relationship with said light transmitting material,
   electrical conducting means secured to said electro-optical transducing means and said composite structure,
   means for electrically energizing said electro-optical transducing means and
   means for generating and transmitting light energy along said light transmitting material for one way communication between said electro-optical transducing means and said light transmitting material.

2. A circuit in accordance with claim 1 wherein said layer of light emitting material is in the form of a thin flat strip.

3. A circuit in accordance with claim 2 wherein said thin flat strip of light emitting material is bonded directly to said substrate.

4. A circuit in accordance with claim 3 wherein said electro-optical transducing means is secured at one end of said thin flat strip.

5. A circuit in accordance with claim 4 wherein said electro-optical transducing means is a solid state laser and said means for electrically energizing said transducing means comprises a plurality of thin flat electrical conductors bonded on said composite structure.

6. A circuit in accordance with claim 1 wherein said layer of light transmitting material comprises a plurality of thin flat strips each having end portions in optical coupling relation with each other to permit light to be passed from one to the other, means for generating light and passing it to one of said strips whereby said light passes from the end of said one strip to the end of the other strip aligned therewith and therefrom through said other strip.

7. A circuit in accordance with claim 6 wherein said transducing means is located at the other end of said other strip to receive light passed through said other strip from said one strip.

8. A circuit in accordance with claim 4 wherein said electro-optical transducing means is a solid state photosensitive device such as a photoelectric cell which operates as a generator of electrical energy which varies in accordance with variations of the light received thereby from said thin flat strip.

9. A circuit in accordance with claim 1 wherein said electro-optical transducing means is a photoelectric cell.

10. A circuit in accordance with claim 1 wherein said electro-optical transducing means is a laser.

* * * * *